United States Patent [19]

Saito et al.

[11] Patent Number: 4,724,162

[45] Date of Patent: Feb. 9, 1988

[54] PROCESS FOR PRODUCING MAGNETIC RECORDING MEDIUM

[75] Inventors: Shinji Saito; Hiroshi Ogawa; Chiaki Mizuno; Toshio Ono; Yasuo Tamai, all of Kanagawa, Japan

[73] Assignee: Fuji Photo Film Co., Ltd., Kanagawa, Japan

[21] Appl. No.: 39,878

[22] Filed: Apr. 20, 1987

[30] Foreign Application Priority Data

Apr. 19, 1986 [JP]   Japan ................................. 61-90608

[51] Int. Cl.$^4$ ............................................. H01F 10/02
[52] U.S. Cl. ..................................... 427/128; 427/130
[58] Field of Search ................ 427/128, 130; 428/694, 428/900

Primary Examiner—Bernard D. Pianalto

Attorney, Agent, or Firm—Sughrue, Mion, Zinn, Macpeak & Seas

[57] ABSTRACT

An improvement of a process for producing a magnetic recording medium comprising coating a non-magnetic support with a magnetic paint comprising a magnetic layer forming component containing ferromagnetic powder and a resin component dispersed in an organic solvent and drying the coated layer. The improvement resides in the preparation of the magnetic paint. In the improvement, the magnetic paint is obtained by kneading said magnetic layer forming component and a first solvent having a solubility parameter of not lower than $9.5[\text{cal.}\cdot\text{cm}^{-3}]^{\frac{1}{2}}$ as measured by Small method and adding a second solvent to the resulting kneaded product so that the mixed organic solvent in the magnetic paint has a solubility parameter of lower than $9.5[\text{cal}\cdot\text{cm}^{-3}]^{\frac{1}{2}}$ to thereby disperse the magnetic layer forming component in the organic solvent.

9 Claims, No Drawings

PROCESS FOR PRODUCING MAGNETIC RECORDING MEDIUM

BACKGROUND OF THE INVENTION

1. Field of the Invention

The present invention relates to a process for producing a magnetic recording medium comprising a non-magnetic support and a magnetic layer.

2. Description of Prior Art

As magnetic recording media for computers, videotapes and audio tapes, there have been used magnetic recording mediums having a magnetic layer on a non-magnetic support.

Such magnetic recording media have been produced by steps including a step wherein a non-magnetic support is coated with a magnetic paint comprising magnetic layer forming components such as a ferromagnetic powder and a resin component dissolved or dispersed in an organic solvent, and the organic solvent in the coated layer is then removed.

Recently, demands for higher-density recording have been desired, and finely divided ferromagnetic powders have been used for the magnetic recording medium.

Generally, when a finely divided ferromagnetic powder is used, electromagnetic conversion characteristic is improved. However, the finer the powder, the dispersibility of the ferromagnetic powder in the magnetic paint becomes poorer. Accordingly, there is a possibility that the squareness ratio of the magnetic layer of the resulting magnetic recording medium is insufficiently improved, or the surface of the magnetic layer is made poorly smooth. Hence, there is a problem that through the finely divided ferromagnetic powder is used for the purpose of improving electromagnetic conversion characteristics, the electromagnetic conversion characteristics of the resulting magnetic recording medium can not be improved to the expected degree.

Generally, a magnetic paint is prepared by adding a small amount of an organic solvent to a magnetic layer forming component comprising a ferromagnetic powder, a resin component, etc., kneading the mixture and dispersing the kneaded mixture in a large amount of an organic solvent.

It has been previously thought that the characteristics of a magnetic recording medium are hardly affected by an organic solvent which are used for the preparation of the magnetic paint. Accordingly, there have been used organic solvents which are inexpensive and have boiling points within a moderate range, such as methyl ethyl ketone, methyl isobutyl ketone and cyclohexanone in the kneading and dispersion steps. So far as the present inventors know, the same organic solvents are used in the kneading and dispersion steps.

The present inventors have studied and found that in the step of kneading the ferromagnetic powder and the resin component, there are differences in the amount and the state of the resin component to be fed to the surface of individual particles of the ferromagnetic powder depending on the types of the organic solvents. It has been also found that the electromagnetic conversion characteristics of the magnetic recording medium are affected by such differences. Accordingly, other consideration is needed in the use of an organic solvents which are used for the production of the magnetic recording medium.

SUMMARY OF THE INVENTION

It is an object of the present invention to provide a process for producing a magnetic recording medium having excellent electromagnetic conversion characteristics in particular.

It is another object of the present invention to provide a method for preparing a magnetic paint which enables such magnetic recording medium to be produced.

Accordingly, the present invention provides an improvement of a process for producing a magnetic recording medium comprising coating a non-magnetic support with a magnetic paint comprising a magnetic layer forming component containing ferromagnetic powder and a resin component dispersed in an organic solvent and drying the coated layer, wherein said magnetic paint is obtained by kneading said magnetic layer forming component and a first solvent having a solubility parameter of not lower than $9.5[cal.cm^{-3}]^{\frac{1}{2}}$ (value as measured by Small method) and adding a second solvent in the kneaded product so that the mixed organic solvent in the magnetic paint has a solubility parameter of lower than $9.5[cal.cm^{-3}]^{\frac{1}{2}}$ to thereby disperse the magnetic layer forming component in the organic solvent.

As methods for determining the solubility parameter of the solvent, there are known various methods. In the present invention, the solubility parameter is determined by Small method.

In the Small method, the solubility parameter ($\delta$) is determined by the following formula:

$$\delta = \rho(\Sigma G/M)$$

wherein is the density of the organic solvent, G is molecular bond constant and M is molecular weight. The molecular bond constant (G) is described in more detail in J. Appl. Chem. 3, 71 (1953) by P. A. Small. The solubility parameter by the Small method is described in more detail in the literature: "Fluidity and Pigment Dispersion of Paint", pp. 274–275 by T. G. Patton (published by Kyoritsu Shuppan Sha, Tokyo, 1971).

According to the present invention, the resin component has high solubility in the first solvent to be used for the kneading step and hence, the resin component can be sufficiently supplied to the circumference of individual particles of the ferromagnetic powder in kneading them. Hence, the resin component can be supplied throughout the particles and adsorbed by the particles, whereby the particles can be coated with the resin component.

In the dispersing stage, the solubility parameter is lowered to thereby lower the solubility of the resin component in the organic solvent. Accordingly, the resin component adsorbed on the ferromagnetic powder is hardly dissolved out in the kneading step and the individual particles of the ferromagnetic powder in the magnetic paint are dispersed in the state where each particle is coated with the resin component so that the agglomerate of the particle is hardly formed and dispersibility is improved.

Therefore, the squareness ratio and the filling rate of the ferromagnetic powder in the magnetic layer prepared by using such magnetic paint are improved, and the magnetic recording medium produced by the present invention has excellent electromagnetic conversion characteristics. Further, since the ferromagnetic powder is well dispersed, the surface of the magnetic layer is made much smoother. Accordingly, the spacing loss between the surface of the magnetic layer and magnetic head is reduced and electromagnetic conversion characteristics can be improved.

DETAILED DESCRIPTION OF THE INVENTION

In the process for producing a magnetic recording medium according to the present invention, a magnetic layer forming component and a first solvent are kneaded together. The magnetic layer forming component comprises a binder and ferromagnetic powder.

Conventional binders may be used. Examples of the binders include vinyl chloride copolymers (e.g., vinyl chloride-vinyl acetate copolymer and terpolymers composed of vinyl chloride, vinyl acetate and a third component such as maleic anhydride), cellulose derivatives (e.g., nitrocellulose), acrylic resins, polyvinyl acetal resins, polyvinyl butyral resins, epoxy resins, phenolic resins, polyurethane resins (e.g., polyester polyurethane resin), polyether polyurethane resins and polycarbonate polyurethane resins.

In the present invention, a combination of a vinyl chloride copolymer and a polyurethane resin is preferred. The vinyl chloride copolymers and the polyurethane resins may contain polar groups such as —OH, —SO$_3$Na and —COOH.

The amount of the binder in the magnetic paint is generally 10 to 100 parts by weight, preferably 20 to 40 parts by weight per 100 parts by weight of the ferromagnetic powder.

Conventional ferromagnetic powder may be used. Examples of the ferromagnetic powders include metal oxide powders such as γ-iron oxide; ferromagnetic powders composed of iron oxide and other metal(s) such as cobalt-containing γ-iron oxide; and finely divided ferromagnetic metal powders containing iron and cobalt or nickel.

When said other metal-iron oxide powder is used as the ferromagnetic powder in the present invention, powder having a specific surface area of 30 m$^2$/g or above is used. When finely divided ferromagnetic metal powder is used, powder having a specific surface area of 42 m$^2$/g or above, preferably 45 m$^2$/g or above is used.

There may be used conventional other metal-iron oxide type ferromagnetic powders such as cobalt-doped type, cobalt-adsorbed type or surface layer formation type.

Examples of the finely divided ferromagnetic metal powders include those composed of 75 wt. % or more of metallic fraction wherein 80 wt. % or more of the metallic fraction is composed of at least one ferromagnetic metal or alloy (e.g., Fe, Co, Ni, Fe-Co, Fe-Ni, Co-Ni and Co-Ni-Fe) and 20 wt. % or less of the metallic fraction may contain other metal or alloy (e.g., Al, Si, Pb, Sc, Ti, V, Cr, Mn, Cu, B, Y, Mo, Rh, Pd, Ag, Sn, Sb, P, Ba, Ta, W, Re, Au, Hg, S, Bi, La, Ce, Pr, Nd, Zn, Te). The ferromagnetic metallic fraction may contain a small amount of water, hydroxide or oxide. Processes for producing these finely divided ferromagnetic metal powders are known, and the finely divided ferromagnetic metal powders which are used for the production of the magnetic recording medium of the present invention can be prepared by such known processes.

Though there are no limitations with regard to the shape of the ferromagnetic powder, the shape is usually needle, particulate, die, rice grain or flake form.

The magnetic layer forming component is kneaded together with a first solvent (organic solvent) having a specific solubility parameter.

The first solvent has a solubility parameter of not higher than 9.5[cal.cm$^{-3}$]$^{\frac{1}{2}}$. Organic solvents having a solubility parameter of 9.5 to 11.5[cal.cm$^{-3}$]$^{\frac{1}{2}}$ are particularly preferred as the first solvent.

The first solvent is highly polar, a good solvent for the resin component and a solvent highly affinitive with the ferromagnetic powder. Accordingly, when an organic solvent having a solubility parameter within the range specified above is used, the resin component is well-dissolved or well-dispersed therein in the kneading procedure. Since the organic solvent has good affinity with the ferromagnetic powder, the solvent well penetrates into the gaps between the particles of the ferromagnetic powder and into recessed parts formed on the surface of the powder, whereby the resin component can be fed to the whole surfaces of the particles of the ferromagnetic powder. Therefore, the particles of the ferromagnetic powder are coated with the resin component so that the particles can be deagglomerated and prevented from being agglomerated in the kneading and dispersion steps.

Accordingly, when kneading is carried out by using an organic solvent having a solubility parameter of lower than 9.5[cal.cm$^{-3}$]$^{\frac{1}{2}}$, the resin component is insufficiently supplied to the ferromagnetic powder and there is difficulty in producing a magnetic recording medium having a high squareness ratio and good electromagnetic conversion characteristics.

Examples of the organic solvent having a solubility parameter within the range specified above include cyclohexanone (δ=9.9[cal.cm$^{-3}$]$^{\frac{1}{2}}$), cyclohexanol (δ=11.4[cal.cm$^{-3}$]$^{\frac{1}{2}}$), 1,4-dioxane (δ=9.9[cal.cm$^{-3}$]$^{\frac{1}{2}}$), tetrahydrofuran (δ=9.9[cal.cm$^{-3}$]$^{\frac{1}{2}}$), ethylene glycol monomethyl ester (δ=10.8[cal.cm$^{-3}$]$^{\frac{1}{2}}$) and ethylene glycol monoethyl ester (δ=9.9[cal.cm$^{-3}$]$^{\frac{1}{2}}$). These organic solvents may be used either alone or as a mixture of two ore more. In the prevent invention, the first solvent must have a solubility parameter within the range specified above. Therefore, when the first solvent is composed posed of two or more solvents, the solubility parameter must be a value defined above. Two or more solvents can be mixed so as to give the above-described solubility parameter.

The kneading of the first solvent and the magnetic layer forming component in a weight ratio of 1:1 to 1:5, preferably 1:1.5 to 1:3 is made.

The kneading can be carried out using conventional kneading device such as roll mill, paddle mill, screw extruder, auger kneader, press kneader, open kneader, continuous kneader or helical rotor.

Kneading time varies depending on the type of the kneading device, the type of the binder, etc., but is generally from 10 minutes to 10 hours.

Subsequently, a dispersing procedure is carried out in such a manner that a second solvent is added to the kneaded product so that the resulting organic solvent mixture in the magnetic paint to be prepared has a solubility parameter of lower than 9.5[cal.cm$^{-3}$]$^{\frac{1}{2}}$, preferably 7.5 to 9.45[cal.cm$^{-3}$]$^{\frac{1}{2}}$ are used as the second solvent, and those having a solubility parameter of 7.5 to 9.45[cal.cm$^{-3}$]$^{\frac{1}{2}}$ are particularly preferred.

The dispersing procedure is carried out in such a manner that the second solvent is added to the kneaded product so as to adjust the solubility parameter of the mixed organic solvent in the magnetic paint to be prepared.

The second solvent is added so as to give the above solubility parameter in carrying out the dispersing procedure. In this way, the dispersing procedure can be performed without causing the excessively dissolving of the resin component penetrated into the depth of individual particles of the ferromagnetic powder in the kneading step.

The dispersing solvent acts as a poor solvent for the resin component by lowering the solubility parameter in the dispersion step. Further, the organic solvent is poorly affinitive to the ferromagnetic powder so that the second solvent hardly penetrates into the depth of the ferromagnetic powder in the dispersing step. The ferromagnetic powder as coated with the resin component in the kneading step which is performed using the first solvent, is dispersed in the dispersing step.

The first solvent contained in the kneaded product can be separated before the dispersing step. Usually, the second solvent is added without separating the first solvent, and the dispersing procedure is carried out by adding the second solvent so as to adjust the solubility parameter of the organic solvent contained in the magnetic paint to be prepared. The weighted average of the solubility parameters of the first and second solvents must be a value not larger than the above-specified value.

Examples of the organic solvents which are employable as the second solvent include methyl ethyl ketone ($\delta = 9.3[cal.cm^{-3}]^{\frac{1}{2}}$), methyl isobutyl ketone ($\delta = 8.4[cal.cm^{-3}]^{\frac{1}{2}}$), ethyl acetate ($\delta = 9.1[cal.cm^{-3}]^{\frac{1}{2}}$), butyl acetate ($\delta = 8.5[cal.cm^{-3}]^{\frac{1}{2}}$), toluene ($\delta = 8.9[cal.cm^{-3}]^{\frac{1}{2}}$), xylene ($\delta = 8.8[cal.cm^{-3}]^{\frac{1}{2}}$) and cyclohexane ($\delta = 7.3[cal.cm^{-3}]^{\frac{1}{2}}$). These solvents may be used either alone or as a mixture of two ore more of them.

When a solvent mixture is used as the second solvent, it is preferred that the solvent mixture contains at least 20 wt. % of a solvent having a boiling point of 90° C. or lower. Among the second solvents, the solvents having a boiling point of 90° C. or lower are methyl ethyl ketone, ethyl acetate and cyclohexane. When the removal rate of the solvent from the magnetic layer is controlled by adjusting the amount of low-boiling solvent, the steps such as drying step can be easily carried out, while keeping the orientation state of the ferromagnetic powder. Accordingly, the squareness ratio of the magnetic layer is further improved.

The dispersion is prepared by adding the second solvent in such a proportion that the amount of the organic solvent in the resulting magnetic paint is in the range of 100 to 500 parts by weight, preferably 150 to 350 parts by weight per 100 parts by weight of the ferromagnetic powder.

The dispersing procedure can be conducted by any conventional method using a conventional dispersion device such as sand mill or ball mill.

Dispersing time varies depending on the type of the dispersing device, the type of the resin component, etc., but is generally from 1 to 60 hours.

The magnetic layer contains other magnetic layer forming components such as abrasive, lubricant (e.g., fatty acid or ester thereof), antistatic agent (e.g., carbon black), etc. in addition to the binder and the ferromagnetic powder. Such magnetic layer forming components may be added at any stage of the kneading and dispersion steps. However, it is desirable that the abrasive is added to the dispersion step to thereby prevent the ferromagnetic powder from being damaged by the contact thereof with the abrasive.

Any of abrasives which are conventionally used for the magnetic recording medium may be used. Examples of the abrasives include $\alpha\text{-}Al_2O_3$, $Cr_2O_3$, $SnO_2$, $SiO_2$, $TiO_2$, $\alpha\text{-}Fe_2O_3$ and $Fe_3O_4$. They may be used either alone or as a mixture of two or more of them. Among them, $\alpha\text{-}Al_2O_3$ is preferred.

The amount of the abrasive in the magnetic paint is in the range of 1 to 20 parts by weight, preferably 5 to 15 parts by weight per 100 parts by weight of the ferromagnetic powder in the magnetic layer.

Preferably, a curing agent in addition to the above-described described resin component is used as a binder. As such binder, a polyisocyanate compound is usually used. In the present invention, it is desirable that the polyisocyanate compound is added just before the preparation of the dispersion, because a curing reaction with the polyisoyanate proceeds after the coating of the magnetic paint and a magnetic layer having high strength can be obtained.

The polyisocyanate compound is used in a ratio of the polyisocyanate to the resin component of preferably 5:95 to 50:50 by weight.

Thus-prepared magnetic paint is applied onto a non-magnetic support. The coating may be carried out by a conventional coating method such as reverse roll coating.

The coating layer of the magnetic paint is formed so as to give a magnetic recording medium having a magnetic layer of 5 to 100 μm in thickness.

As the non-magnetic support, conventional support made of a plastic may be used.

Generally, a non-magnetic support of 3 to 50 μm, preferably 5 to 30 μm in thickness is used.

A back layer (backing layer) may be provided on the side of the support, on which the magnetic paint is not coated. If desired, an adhesive layer may be provided on the side of the support, on which the magnetic layer is coated.

Generally, the coated magnetic paint layer is subjected to a magnetic field orientation treatment wherein the ferromagnetic powder contained in the coated layer is orientated, and the coated layer is then dried.

After being dried, the coated layer is usually subjected to surface-smoothing treatment and then cut into the desired shape. The surface-smoothing treatment is carried out, for instance, by using supercalender roll, By carrying out the surface smoothing treatment, voids formed by the removal of the solvent in the drying step become extinct and the filling rate of the ferromagnetic powder in the magnetic layer is improved so that a magnetic recording medium having excellent electromagnetic conversion characteristics can be obtained.

The cutting or slitting procedure may be carried out under conventional conditions by using a conventional cutter or slitter.

The following examples and comparison examples further illustrate the present invention. Parts given below are by weight unless otherwise stated.

EXAMPLE 1

The following components and 50 parts of cyclohexanone (first solvent) ($\delta=9.9[cal.cm^{-3}]^{\frac{1}{2}}$) were kneaded together in a kneader for one hour.

| Magnetic layer forming components | |
|---|---|
| Co-containing $\gamma$-Fe$_2$O$_3$ (Hc: 650 Oe, specific surface area: 35 m$^2$/g) | 100 parts |
| Vinyl chloride/vinyl acetate/maleic anhydride copolymer (Nippon Geon Co., Ltd.: 400 × 110A, degree of polymerization: 400) | 10 parts |
| Polyurethane resin | 8 parts |

Three parts of $\alpha$-Al$_2$O$_3$, two parts of carbon black, stearic acid, one part of butyl stearate and 200 parts of methyl ethyl ketone (second solvent; $\delta=9.3[cal.cm^{-3}]^{\frac{1}{2}}$, boiling point: 80° C.) were added to the resulting kneaded product, and the dispersion was carried out by using a sand mill. Further, 6 parts of a polyisocyanate compound (available from Nippon Polyurethane Co. under tradename of Coronate L) was added thereto to prepare a magnetic paint.

The solvent in the resulting magnetic paint had a solubility parameter of $9.4[cal.cm^{-3}]^{\frac{1}{2}}$.

The magnetic paint was coated on a polyester terephthalate support of 7 μm in thickness in such an amount as to provide a coated layer having a dry thickness of 5.0 μm. The coated layer was then subjected to a magnetic field orientation treatment by using an electromagnet (1,000 gauss) and dried to remove the organic solvent contained in the magnetic layer. The coated support was calendered to smooth the surface of the magnetic layer and slitted into ½ inch wide tape, thus producing VHS type video type.

EVALUATION OF VIDEO TAPE

The squareness ratio of the video tape, the surface glossiness of the magnetic layer thereof and the video reproducing output of recording signals at 4 MHz are shown in Table 1.

In the above-described example, examples described hereinafter and comparison examples described hereinafter, the squareness ratio of the video tape, the surface glossiness of the magnetic layer thereof and the video reproducing output of recording signals at 4 MHz were measured according to the following procedures.

SQUARENESS RATIO

The squareness ratio in Examples 1 to 6 and Comparison Examples 1 to 3 is a ratio of Br/Rm determined from saturation induction (magnetic flux density) (Bm) measured at magnetic field intensity of 2 KOe and residual induction (magnetic flux density) (Br).

The squarenes ration in Examples 7 to 12 and Comparison Examples 1 to 6 is a ratio of Br/Bm determined from saturation induction (magnetic flux density) (Bm) at magnetic field intensity of 5 KOe and residual induction (magnetic flux density) (Br).

SURFACE GLOSSINESS

The surface glossiness of the magnetic layer was determined by measuring total reflectance at an angle of incidence of 45 degrees and at an angle of reflection of 45 degrees with a standard glossmeter.

VIDEO REPRODUCING OUTPUT

Video reproducing output was measured by recording signals at 4 MHz on a video tape with a commercially available video recorder (Matsushita Electric Industrial Co., Ltd., MV-6600 type) and reproducing it to measure video output. The values listed on the following tables are relative values, when the video output of commercially available VHS video tape (Fuji Photo Film Co., Ltd., ferromagnetic powder: Co-containing $\gamma$-iron oxide) is definedto be OdB.

EXAMPLE 2

The procedure of Example 1 was repeated except that 200 parts of a mixed solvent ($\delta=8.9[cal.cm^{-3}]^{\frac{1}{2}}$) consisting of methyl ethyl ketone and butyl acetate (50:50 by weight) as the second solvent was used to prepare a magnetic paint.

The solvent contained in the resulting magnetic paint had a solubility parameter of $9.1[cal.cm^{-3}]^{\frac{1}{2}}$. In a similar manner to that described in Example 1, VHS type video tape was prepared.

The squareness ratio of the video tape, the surface glossiness if the magnetic layer thereof and the video reproducing output of recording signals at 4 MHz are shown in Table 1.

EXAMPLE 3

The procedure of Example 1 was repeated except that 200 parts of butyl acetate ($\delta=8.5[cal.cm^{-3}]^{\frac{1}{2}}$) as the second solvent was used to prepare a magnetic paint. The solvent contained in the resulting magnetic paint had a solubility parameter of $8.8[cal.cm^{-3}]^{\frac{1}{2}}$.

In a similar manner to that described above, VHS type video tape was prepared by using the magnetic paint.

The squareness ratio of the video tape, the surface glossiness of the magnetic layer thereof and the video reproducing output of recording signals at 4 MHz are shown in Table 1.

EXAMPLE 4

The procedure of Example 1 was repeated except that 200 parts of toluene ($\delta=8.9[cal.cm^{-3}]^{\frac{1}{2}}$) was used as the second solvent to prepare a magnetic paint. The solvent contained in the resulting magnetic paint had a solubility parameter of $9.0[cal.cm^{-3}]^{\frac{1}{2}}$.

In a similar manner to that described above, VHS type video tape was prepared by using the magnetic paint.

The squareness ratio of the video tape, the surface glossiness of the magnetic layer thereof and the video reproducing output of recording signals at 4 MHz are shown in Table 1.

EXAMPLE 5

The procedure of Example 1 was repeated except that 50 parts of ethylene glycol monoethyl ether (Cellosolve) ($\delta=9.9[cal.cm^{-3}]^{\frac{1}{2}}$) was used as the first solvent to prepare a magnetic paint. The solvent contained in the resulting magnetic paint had a solubility parameter of $9.4[cal.cm^{-3}]^{\frac{1}{2}}$.

In a similar manner to that described above, VHS type video tape was prepared by using the magnetic paint.

The squareness ratio of the video tape, the surface glossiness of the magnetic layer thereof and the video reproducing output of recording signals at 4 MHz are shown in Table 1.

EXAMPLE 6

The procedure of Example 1 was repeated except that a mixed solvent ($\delta=9.6[cal.cm^{-3}]^{\frac{1}{2}}$) consisting of cyclohexanone and methyl ethyl ketone (50:50 by weight) was used as the first solvent to prepare a magnetic paint. The solvent contained in the resulting magnetic paint had a solubility parameter of $9.3[cal.cm^{-3}]^{\frac{1}{2}}$.

In a similar manner to that described above, VHS type video tape was prepared by using the magnetic paint.

The squareness ratio of the video tape, the surface glossiness of the magnetic layer thereof and the video reproducing output of recording signals at 4 MHz are shown in Table 1.

COMPARISON EXAMPLE 1

The procedure of Example 1 was repeated except that cyclohexanone ($\delta=9.9[cal.cm^{-3}]^{\frac{1}{2}}$ was used as the first and second solvents to prepare a magnetic paint.

In a similar manner to that described above, VHS type video tape was prepared by using the magnetic paint.

The squareness ratio of the video tape, the surface glossiness of the magnetic layer thereof and the video reproducing output of recording signals at 4 MHz are shown in Table 1.

COMPARISON EXAMPLE 2

The procedure of Example 1 was repeated except that butyl acetate ($\delta=8.5[cal.cm^{-3}]^{\frac{1}{2}}$) as the first solvent and cyclohexanone ($\delta=9.9[cal.cm^{-3}]^{\frac{1}{2}}$) as the second solvent were used to prepare a magnetic paint.

In a similar manner to that described above, VHS type video tape was prepared by using the magnetic paint.

The squareness ratio of the video tape, the surface glossiness of the magnetic layer thereof and the video reproducing output of recording signals at 4 MHz are shown in Table 1.

COMPARISON EXAMPLE 3

The procedure of Example 1 was repeated except that butyl acetate ($\delta=8.5[cal.cm^{-3}]^{\frac{1}{2}}$) was used as the first and second solvents to prepare a magnetic paint.

In a similar manner to that described above, VHS type video tape was prepared by using the magnetic paint.

The squareness ratio of the video tape, the surface glossiness of the magnetic layer thereof and the video reproducing output of recording signals at 4 MHz are shown in Table 1.

TABLE 1

| | Squareness Ratio | Surface Glossiness (%) | Video Output (dB) |
| --- | --- | --- | --- |
| Example 1 | 0.86 | 172 | +2.4 |
| Example 2 | 0.84 | 168 | +2.0 |
| Example 3 | 0.83 | 164 | +1.8 |
| Example 4 | 0.83 | 160 | +1.5 |
| Example 5 | 0.85 | 170 | +2.1 |
| Example 6 | 0.85 | 168 | +2.0 |
| Comp. Ex. 1 | 0.79 | 146 | −0.2 |
| Comp. Ex. 2 | 0.77 | 150 | +0.2 |
| Comp. Ex. 3 | 0.80 | 154 | +0.8 |

EXAMPLES 7–12

The procedures of Examples 1 to 6 were repeated except that an equal amount of finely divided ferromagnetic metallic powder (Hc: 1,400 Oe, specific surface area; 45 m²/g) was used in place of Co-containing $\gamma$-Fe$_2$O$_3$. There was prepared VHS type video tape.

The squareness ratio of the video tape, the surface glossiness of the magnetic layer thereof and the video reproducing output of recording signals at 4 MHz are shown in Table 2.

COMPARISON EXAMPLES 4–6

The procedures of Comparison Examples 1 to 3 were repeated except that an equal amount of finely divided ferromagnetic metallic powder (Hc: 1,400 Oe, specific surface area: 45 m²/g) was used in place of Co-containing $\gamma$-Fe$_2$O$_3$. There was prepared VHS type video tape.

The squareness ratio of the video tape, the surface glossiness of the magnetic layer thereof and the video reproducing output of recording signals at 4 MHz are shown in Table 2.

TABLE 2

| | Squareness Ratio | Surface Glossiness (%) | Video Output (dB) |
| --- | --- | --- | --- |
| Example 7 | 0.83 | 252 | +9.6 |
| Example 8 | 0.81 | 246 | +9.2 |
| Example 9 | 0.81 | 242 | +9.0 |
| Example 10 | 0.80 | 240 | +8.8 |
| Example 11 | 0.82 | 248 | +9.4 |
| Example 12 | 0.81 | 244 | +9.0 |
| Comp. Ex. 4 | 0.74 | 220 | +7.4 |
| Comp. Ex. 5 | 0.76 | 224 | +7.5 |
| Comp. Ex. 6 | 0.77 | 228 | +7.8 |

We claim:

1. In a process for producing a magnetic recording medium comprising coating a non-magnetic support with a magnetic paint comprising a magnetic layer forming component containing ferromagnetic powder and a resin component which is dispersed in an organic solvent and drying the coated layer, the improvement wherein said magnetic paint is obtained by kneading said magnetic layer forming component and a first solvent having a solubility parameter of not lower than $9.5[cal.cm^{-3}]^{\frac{1}{2}}$ as measured by Small method, and adding a second solvent to the kneaded product so that the mixed organic solvent in the magnetic paint has a solubility parameter of lower than $9.5[cal.cm^{-3}]^{\frac{1}{2}}$ to thereby disperse the magnetic layer forming component in the organic solvent.

2. The process for producing a magnetic recording medium as claimed in claim 1, wherein said first solvent has a solubility parameter of 9.5 to $11.5[cal.cm^{-3}]^{\frac{1}{2}}$.

3. The process for producing a magnetic recording medium as claimed in claim 1, wherein said second solvent has a solubility parameter of 7.5 to $9.45[cal.cm^{-3}]^{\frac{1}{2}}$.

4. The process for producing a magnetic recording medium as claimed in claim 1, wherein said second solvent has a solubility parameter of 7.5 to $9.5[cal.cm^{-3}]^{\frac{1}{2}}$.

5. The process for producing a magnetic recording medium as claimed in claim 1, wherein said first solvent is at least one organic solvent selected from the group consisting of cyclohexanone, cyclohexanol, 1,4-dioxane, tetrahydrofuran, ethylene glycol monomethyl ester and ethylene glycol monoethyl ester.

6. The process for producing a magnetic recording medium as claimed in claim 1, wherein said second solvent is at least one organic solvent selected from the group consisting of methyl ethyl ketone, methyl isobutyl ketone, ethyl acetate, butyl acetate, toluene, xylene and cyclohexane.

7. The process for producing a magnetic recording medium as claimed in claim 1, wherein said second solvent contains at least 20 wt. % of an organic solvent having a boiling point of not higher than 90° C.

8. The process for producing a magnetic recording medium as claimed in claim 1, wherein said resin component contains a polyurethane resin and a vinyl chloride copolymer.

9. The process for producing a magnetic recording medium as claimed in claim 1, wherein said magnetic paint contains an abrasive and said abrasive is added to the kneaded product in dispersing said knead product.

* * * * *